United States Patent
Oakes et al.

(10) Patent No.: US 7,201,309 B2
(45) Date of Patent: Apr. 10, 2007

(54) SERIAL NUMBER ALLOCATION

(75) Inventors: Jonathan Oakes, Keene, NH (US); David Benjamin, Keene, NH (US)

(73) Assignee: Markem Corporation, Keene, NH (US)

(*) Notice: Subject to any disclaimer, the term of this patent is extended or adjusted under 35 U.S.C. 154(b) by 375 days.

(21) Appl. No.: 10/899,839

(22) Filed: Jul. 26, 2004

(65) Prior Publication Data
US 2006/0016866 A1    Jan. 26, 2006

(51) Int. Cl.
*G06F 17/00* (2006.01)
(52) U.S. Cl. .............. 235/375; 235/376; 235/380; 235/393
(58) Field of Classification Search ........... 235/375, 235/376, 380, 383
See application file for complete search history.

(56) References Cited

U.S. PATENT DOCUMENTS

2001/0030232 A1* 10/2001 Platek ................. 235/375
2003/0058113 A1    3/2003 Neidig et al.
2003/0192947 A1   10/2003 Toedtli
2005/0199724 A1*  9/2005 Lubow ............. 235/462.01

* cited by examiner

*Primary Examiner*—Michael G. Lee
*Assistant Examiner*—Allyson N Trail
(74) *Attorney, Agent, or Firm*—Fish & Richardson P.C.

(57) ABSTRACT

A method for allocating serial numbers among packaging sites includes receiving, from a packaging site, a query directed to a first server for the identity of a second server, providing the packaging site with information, from the first server, the information leading to the second server, receiving, from the packaging site, a query directed to the second server for the identity of a third server, providing the packaging site information, from the second server, the information leading to the third server. The method also includes receiving, from the packaging site, a query directed to the third server; and providing the packaging site at least one serial number from the third server.

19 Claims, 7 Drawing Sheets

| Version 2 | Manufacturer Identifier 4 | Product Identifier 6 | Item Serial Number 8 |
|---|---|---|---|

Version 2 — Manufacturer Identifier 4 — Product Identifier 6 — Item Serial Number 8

FIG. 1B

SERIAL NUMBER ALLOCATION

BACKGROUND

An electronic product code (EPC) is a naming scheme used to uniquely identify individual items or products. The EPC provides additional information not provided in a typical universal product code (UPC). The UPC provides a unique identifier for each make or model of a product while the EPC provides a unique identifier for each individual item of a product.

As shown in FIGS. 1A and 1B, one example of an EPC includes 96 bits of identification data, including a serial number 8 to identify individual items. The identification numbers or EPC bits may be represented by bar code symbols to enable the electronic (optical) reading at the point of sale, upon receiving at warehouses or in any other stage, where the capture of data is necessary for the business processes. In addition to the serial number 8, the EPC bits includes a version 2, manufacturer identifier 4, and product identifier 6. In the example shown in FIG. 1B, the version 2 is 8 bits. The manufacturer ID 4 is 28 bits and provides greater than 268 million possible combinations for unique manufacturers. The product ID 6 is 24 bits and provides greater than 16 million possible combinations for unique products for each manufacturer. The serial number 8 is 36 bits and provides greater than 68 billion possible unique items per product.

SUMMARY

According to an aspect of the invention a method for allocating serial numbers among a plurality of packaging sites includes receiving, from a packaging site, a query directed to a first server for the identity of a second server. The second server is assigned to manage serial numbers for a particular manufacturer. The method also includes providing the packaging site with information, from the first server, the information leading to the second server, and receiving, from the packaging site, a query directed to the second server for the identity of a third server. The third server is assigned to manage serial numbers for a particular product. The method also includes providing the packaging site information, from the second server, the information leading to the third server, receiving, from the packaging site, a query directed to the third server; and providing the packaging site at least one serial number from the third server.

Embodiments of the invention may include one or more of the following features. The first server can be a registry server. The second server can be a manufacturer reference server. The third server can be an item reference server.

Receiving at least one serial number can include receiving a single serial number or receiving a block of serial numbers. The method can also include assigning the serial number to an individual product at the packaging site.

Receiving, from the packaging site, a query can include receiving a query that includes a manufacturer prefix. Receiving, from the packaging site, a query directed to the second server can include receiving an item reference from the packaging site.

The information leading to at least one of the second or third server can include a URL. Two or more of the first, second, and third servers can reside on the same physical computer. The first server, the second server, and the third server can be configured to operate independently of each other.

The method can also include providing the packaging site with information needed to generate at least one of an Electronic Product Code (EPC) or a Serialized Global Trade Identification Number (SGTIN).

A query can be based on a Web Services communication protocol or on a SOAP communication protocol. The third server can assign serial numbers based on predefined rules.

In some examples, providing the packaging site at least one serial number can include providing the packaging site with a block of serial numbers.

A centralized serial number allocation system allows serial numbers to be allocated across multiple geographic locations and organizational entities. The allocation system can provide reliability and consistency in the allocation. In addition, since the serial number allocation system is central to multiple packaging sites, the allocation system can track the serial number assignments and provide historical data.

In some examples, the serial number allocation system also preserves the data integrity of the serial numbers. Secure connections can protect the serial numbers from unauthorized use.

The serial number allocation system includes multiple servers (e.g. a registry server, a manufacturer reference server, and an item reference server) each of which maintains a particular subset of information. Each server provides a reference to another server until the server distributing serial numbers for a particular item is finally located by the packaging site. This architecture provides the advantage of being scaleable, both in the number of manufacturers and items as well as the number of packaging sites.

Other features and advantages of the invention will become apparent from the following description, and from the claims.

DESCRIPTION OF DRAWINGS

FIG. 1A is a block diagram of an electronic product code.

FIG. 1B is an example of an electronic product code.

DESCRIPTION

Figure 2:
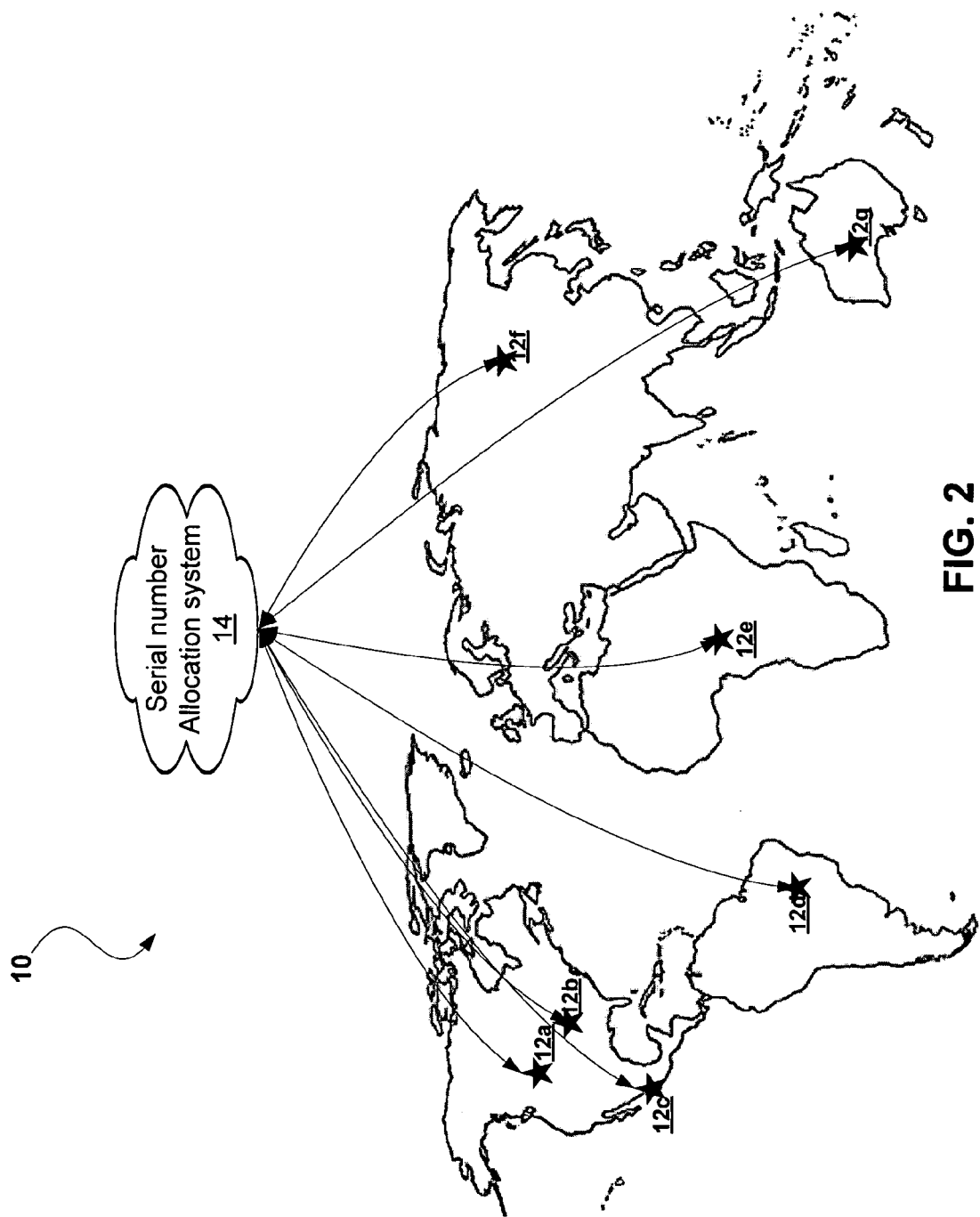
FIG. 2 shows a serial number allocation system in communication with multiple packaging sites.

Referring to FIG. 2, a system for allocating serial numbers includes multiple packaging sites 12*a*–*g*. Each packaging site can assign serial numbers to one or more different products and multiple packaging sites can package the same product. In order to uniquely identify each item packaged in each of the packaging sites, serial numbers are assigned to the items. The serial numbers are allocated such that a single serial number is unique and no two items share the same EPC code.

For example, sites 12*a* and 12*e* could each produce multiple types of soup for a particular manufacturer. In order to uniquely identify each individual can of soup, an EPC code (as shown in FIGS. 1A and 1B) is placed on each can of soup. Since two packaging plants are producing cans of soup for the same manufacturer, the manufacturer identification on the cans of soup will be the same. Since each packaging plant produces multiple types of soup, the packaging plant must use a different product identifier in the EPC code for each type of soup. Although, the manufacturer ID and product ID will be the same for each type of soup between the two sites, each can of soup is assigned a unique serial number (e.g., the serial number is unique for the product and universally unique when combined with the manufacturer identification and product identification). The serial number allocation system 14 uniquely assigns the serial numbers across the multiple sites.

Multiple packaging sites 12a–g can reference a serial number allocation system 14. The serial number allocation system 14 allocates serial numbers to the individual packaging sites and ensures that serial numbers are unique for each item even if the items were packaged at different sites.

Figure 3:
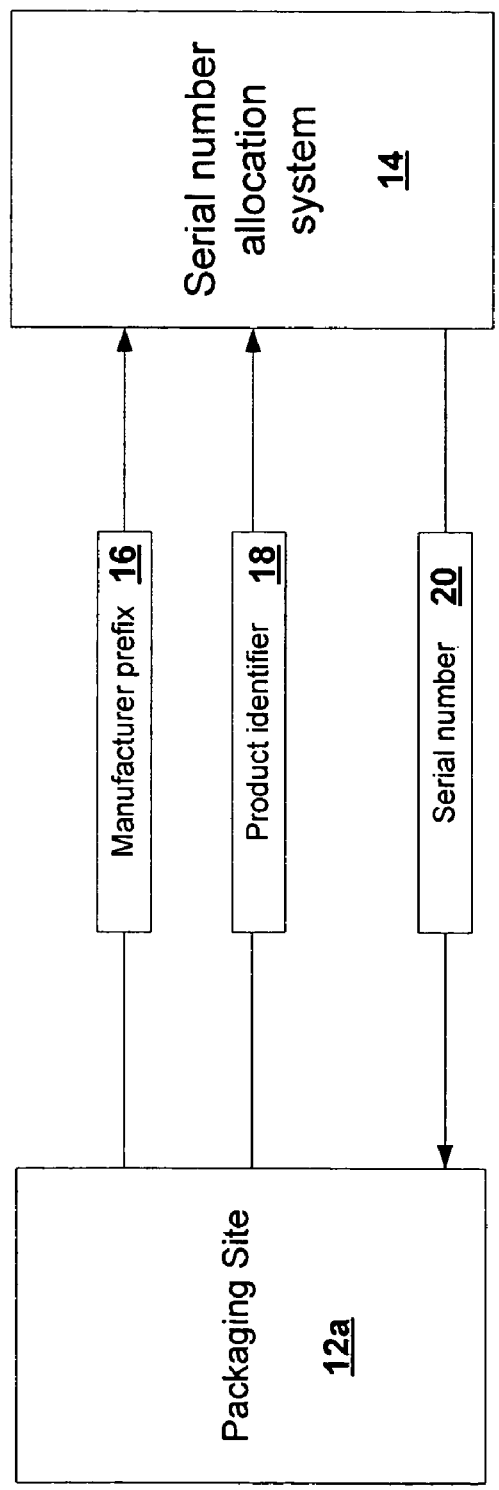
FIG. 3 shows data flow between a packaging site and a serial number allocation system.

Referring to FIG. 3, an overview of the communication between a packaging site 12a and the serial number allocation system 14 is shown. The packaging site 12a sends the manufacturer prefix 16 and the product identifier 18 to the serial number allocation system 14. Based on the manufacturer prefix 16 and the product identifier 18 the serial number allocation system 14 determines the next available serial number for the particular product and returns a unique serial number 20 for the item to the packaging site 12.

Figure 4:
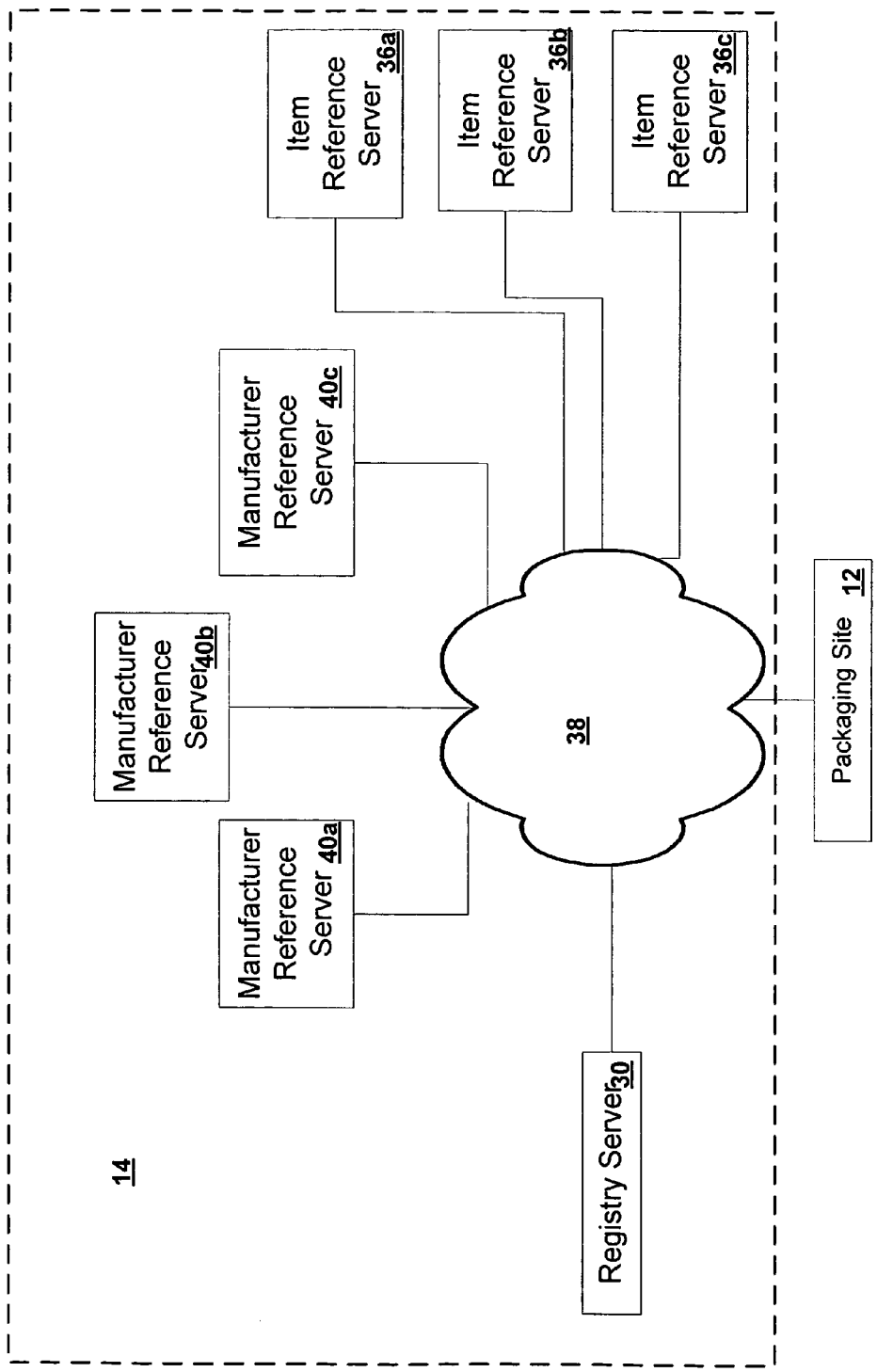
FIG. 4 is a block diagram of components of the serial number allocation system shown in FIG. 3.

Referring to FIG. 4, the serial number allocation system 14 includes multiple servers or systems in communication with a packaging site 12. The packaging site 12 references the systems in the serial number allocation system 14 to determine a serial number (or set of serial numbers) to assign to a particular item (or items). The serial number allocation system 14 includes a registry server 30, multiple manufacturer reference servers 40a–c, and multiple item reference servers 36a–c. The packaging site 12 communicates with the servers 30, 36, and 40 using a network 38 such as the internet or an intranet. Secure communication protocols can be used to ensure the integrity of the data. For example, the packaging site 12 can query the servers using a "web services" or "SOAP" protocol.

The registry server 30 includes a registry of manufacturers. The registry includes URL addresses or other identifying information, such as the IP address of a manufacturer reference server 40, for each manufacturer in the registry. Based on the received manufacturer identifier prefix 16, the registry server 30 provides the packaging site 12 with a reference for a particular one of the manufacturer servers 40. A single manufacturer can be associated with multiple manufacturer reference numbers and/or multiple manufacturer servers 40.

The manufacturer servers 40 each include a registry or database of products for a particular manufacturer. The packaging site 12 provides the product identifier to the manufacturer reference server 40 associated with the product. Based on the product identifier, the manufacturer reference server 40 provides a URL or other identifier for an item reference server 36 associated with the particular item or product.

The item reference servers 36 each include a set of serial numbers for a particular item. The packaging site 12 queries the item reference server 36 based on the identifier received from the manufacturer reference server 40. When the packaging site 12 queries the item reference server 36, the item reference server 36 determines an available serial number and returns that serial number to the packaging site 12.

Figure 5:
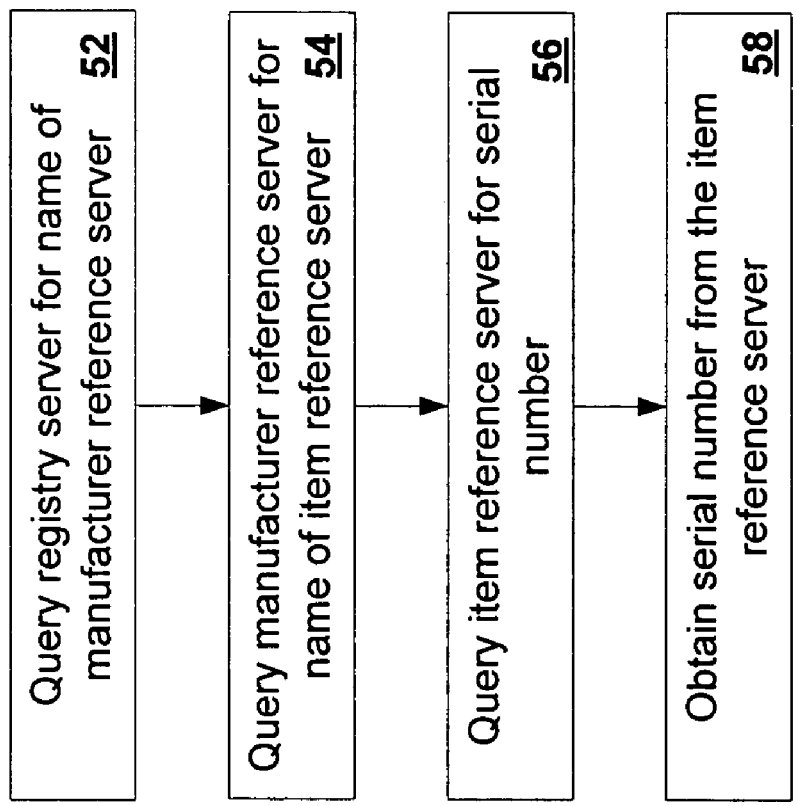
FIG. 5 is a flow chart showing the allocation of individual serial numbers.

FIG. 5 shows the determination and allocation of a unique serial number for a single item using the serial number allocation system 14. The packaging site 12 queries the registry server 30 to determine the location of a manufacturer reference server 40 (step 52). Based on the determined location, the packaging site 12 queries the manufacturer reference server 40 to determine the location of an item reference server 36 (step 54). Based on the determined item reference server 36, the packaging site 12 queries the item reference server 36 to determine a serial number (step 56) and the packaging site 12 receives from the item reference server 36 a unique serial number for an item (step 58).

While the allocation process described above results in the assignments of a single unique serial number to an item, the serial number allocation system 14 can alternately assign a block of serial numbers to a packaging site 12. When the serial number allocation system 14 provides a block of serial numbers to the packaging site 12, the packaging site 12 assigns the unique serial numbers to each item until each unique serial number in the block of serial numbers has been assigned. At this point, if additional numbers are needed, the packaging site 12 can query the serial number allocation system 14 to receive another block of serial numbers. This can be advantageous when a line is generating a large volume of the same type of product for the same manufacturer because this process reduces the amount of communication between the serial number allocation system 14 and the packaging site 12.

Figure 6:
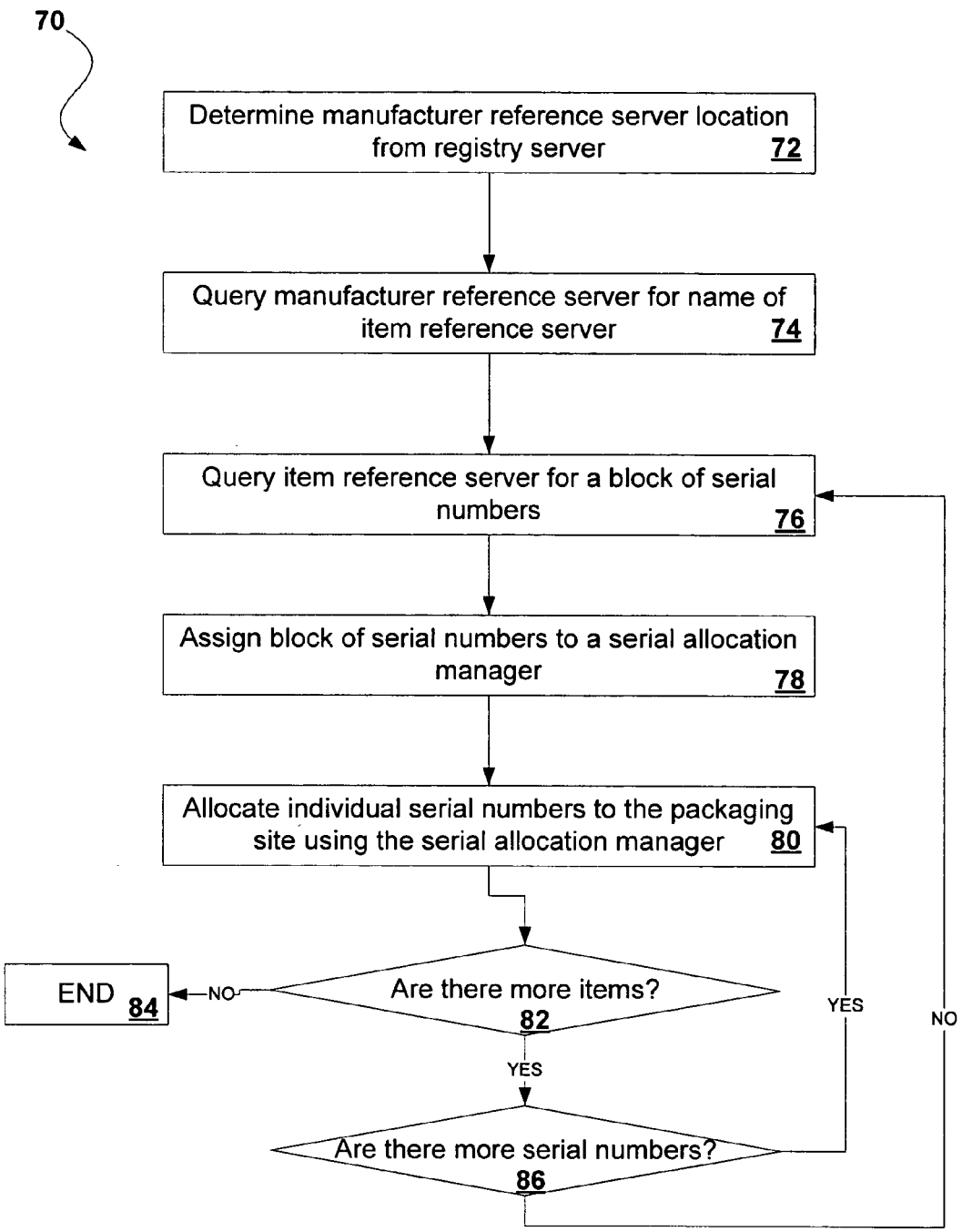
FIG. 6 is a flow chart showing the allocation of blocks of serial numbers.

FIG. 6 shows the determination and assignment of a unique serial number for an item, including a system that assigns serial numbers from a block of serial numbers using the serial number allocation system 14. The packaging site 12 queries the registry server 30 to determine the location of a manufacturer reference server 40 (step 72). Based on the determined location, the packaging site 12 queries the manufacturer reference server 40 to determine the location of an item reference server 36 (step 74). Based on the determined item reference server 36, the packaging site 12 queries the item reference server 36 to determine a set of serial numbers (step 76) and receives from the item reference server 36 a set of serial numbers for the product (step 78). The packaging site 12 allocates individual serial numbers from the set of serial numbers to individual items (step 80). The packaging site 12 determines if there are additional items needing a serial number (step 82). If there are no additional items, then the serial number allocation ends. If there are additional items, the packaging site 12 determines if there are serial numbers from the block of serial numbers not yet assigned (step 86). If there are additional serial numbers available, the packaging site 12 returns to allocating the serial numbers (step 80). If there are no serial numbers available, the packaging site 12 queries the reference server to receive another block of serial numbers.

While the processes described above includes three layers of servers that are queried to assign serial numbers (e.g., two to provide information such as a URL leading to a server that assigns serial numbers for a particular product, and one that assigns the serial numbers), a different number of servers or systems could be used.

For example, the packaging site 12 could maintain a link to the manufacturer reference server for a particular manufacturer. In this two-layer example, the manufacturer reference server could be queried directly to obtain information leading to the item reference server (i.e., a two server system).

In another example, a registry server or manufacturer reference server might include a subset of information leading to the next server (e.g., a manufacturer server could include information leading to half of the item reference servers for a manufacturer). In this example, another step, perhaps implemented using an additional server, could be included to provide the information.

Figure 7:
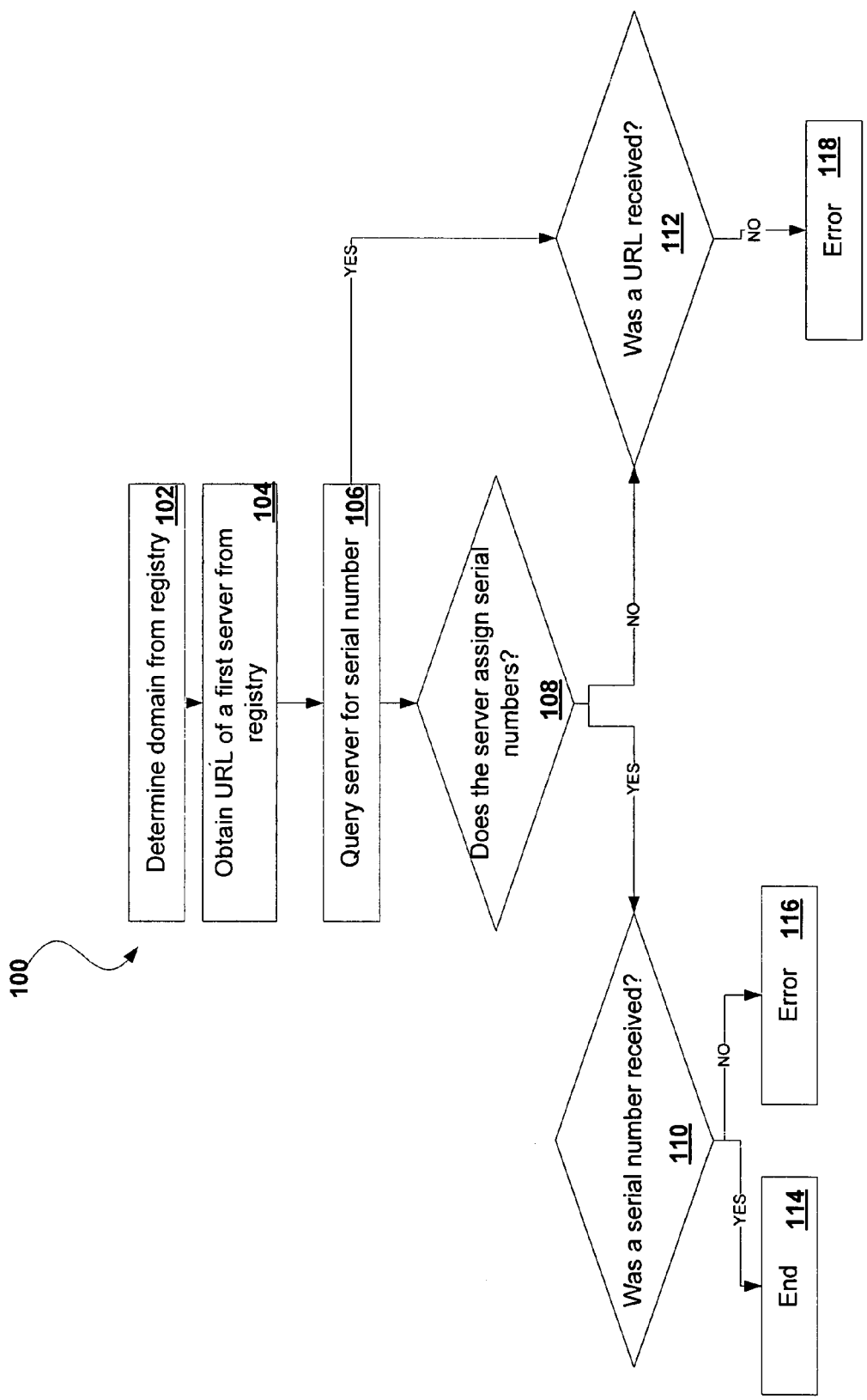
FIG. 7 is a flow chart showing a multi-server process for the assignment of serial numbers.

Referring to FIG. 7, a process 100 for determining a serial number for a particular item is shown. This process is scaleable to any number of servers as long as each server provides information leading to another server in such a way that the server that allocates the serial number can be located by a packaging site 12. Process 100 includes determining a domain from a registry server (step 102) and obtaining a URL of a first server from the registry (step 104). Process 100 queries the server based on the obtained URL for a serial number (step 106) and determines if the server assigns serial numbers (step 108). If the server assigns serial numbers, process 100 determines if a serial number was received (step 110). If a serial number was received, the process ends (step 114). If a serial number was not received, the process displays an error message (step 116). If the server does not assign serial numbers, process 100 determines if a URL was received (step 112). If a URL was received, process 100 uses the URL to query a different server and returns to step 106. If a URL is not received, process 100 displays an error message (step 118).

While the examples above refer to different servers performing different portions of the serial number allocation process, other configurations could be used. For example, all processing could occur on ASICS or general processors. In addition, the processes performed by different servers could be carried out on a single server or system.

Other embodiments are within the scope of the following claims:

The invention claimed is:

1. A method for allocating serial numbers among a plurality of packaging sites, the method comprising:
    receiving, from a packaging site, a query directed to a first server for an identity of a second server, the second server assigned to manage serial numbers for a particular manufacturer;
    providing the packaging site with information, from the first server, the information leading to the second server;
    receiving, from the packaging site, a query directed to the second server for the identity of a third server, the third server assigned to manage serial numbers for a particular product;
    providing the packaging site information, from the second server, the information leading to the third server;
    receiving, from the packaging site, a query directed to the third server; and
    providing the packaging site at least one serial number from the third server.

2. The method of claim 1 further comprising locating the second server through a URL provided by the first server.

3. The method of claim 1 further comprising locating the third server through a URL provided by the second server.

4. The method of claim 1, wherein the first server comprises a registry server.

5. The method of claim 1, wherein the second server comprises a manufacturer reference server.

6. The method of claim 1, wherein the third server comprises an item reference server.

7. The method of claim 1, wherein receiving at least one serial number includes receiving a single serial number.

8. The method of claim 1, wherein receiving at least one serial number includes receiving a block of serial numbers.

9. The method of claim 1, further comprising assigning the serial number to an individual product at the packaging site.

10. The method of claim 1, wherein receiving, from the packaging site, a query includes receiving a query that includes a manufacturer prefix.

11. The method of claim 1, wherein receiving, from the packaging site, a query directed to the second server includes receiving an item reference from the packaging site.

12. The method of claim 1, wherein the information leading to at least one of the second or third server includes a URL.

13. The method of claim 1, wherein two or more of the first, second, and third servers reside on the same physical computer.

14. The method of claim 1, further comprising providing the packaging site with information needed to generate at least one of an Electronic Product Code (EPC) and a Serialized Global Trade Identification Number (SGTIN).

15. The method of claim 1, wherein at least one of causing a packaging site to query a first server and causing a packaging site to query a second server includes sending a query based on a Web Services communication protocol.

16. The method of claim 1, wherein at least one of causing a packaging site to query a first server and causing a packaging site to query a second server includes sending a query based on a SOAP communication protocol.

17. The method of claim 1, wherein the third server assigns serial numbers based on predefined rules.

18. The method of claim 1, wherein providing the packaging site at least one serial number includes providing the packaging site with a block of serial numbers.

19. The method of claim 16, wherein the first server, the second server, and the third server are configured to operate independently of each other.

* * * * *